(12) United States Patent
Barron

(10) Patent No.: US 9,672,604 B2
(45) Date of Patent: *Jun. 6, 2017

(54) CONVOLUTIONAL COLOR CORRECTION

(71) Applicant: Google Inc., Mountain View, CA (US)

(72) Inventor: Jonathan T. Barron, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/096,770

(22) Filed: Apr. 12, 2016

(65) Prior Publication Data

US 2016/0350900 A1 Dec. 1, 2016

Related U.S. Application Data

(63) Continuation of application No. 14/689,246, filed on Apr. 17, 2015, now Pat. No. 9,336,582.

(51) Int. Cl.
*G06K 9/00* (2006.01)
*G06T 5/40* (2006.01)
(Continued)

(52) U.S. Cl.
CPC ............... *G06T 5/40* (2013.01); *G06T 5/001* (2013.01); *G06T 5/009* (2013.01); *G06T 5/10* (2013.01);
(Continued)

(58) Field of Classification Search
CPC ......... G06T 11/001; G06T 7/408; G06T 5/40; G06T 5/001; G06T 5/20;
(Continued)

(56) References Cited

U.S. PATENT DOCUMENTS

| 5,729,691 A | 3/1998 | Agarwal | |
| 6,043,909 A * | 3/2000 | Holub | G06F 3/1267 348/E17.004 |

(Continued)

OTHER PUBLICATIONS

Adams et al., "Fast High-Dimensional Filtering Using the Permutohedral Lattice," Eurographics, 2010, pp. 753-762, vol. 29, No. 2.

(Continued)

*Primary Examiner* — Amir Alavi
(74) *Attorney, Agent, or Firm* — McDonnell Boehnen Hulbert & Berghoff LLP

(57) ABSTRACT

A computing device may obtain an input image. The input image may have a white point represented by chrominance values that define white color in the input image. Possibly based on colors of the input image, the computing device may generate a two-dimensional chrominance histogram of the input image. The computing device may convolve the two-dimensional chrominance histogram with a filter to create a two-dimensional heat map. Entries in the two-dimensional heat map may represent respective estimates of how close respective tints corresponding to the respective entries are to the white point of the input image. The computing device may select an entry in the two-dimensional heat map that represents a particular value that is within a threshold of a maximum value in the heat map, and based on the selected entry, tint the input image to form an output image.

20 Claims, 7 Drawing Sheets

(51) Int. Cl.
| | |
|---|---|
| H04N 9/73 | (2006.01) |
| H04N 1/60 | (2006.01) |
| G06T 5/00 | (2006.01) |
| G06T 5/10 | (2006.01) |
| G06T 5/20 | (2006.01) |

(52) U.S. Cl.
CPC ............. G06T 5/20 (2013.01); H04N 1/6027 (2013.01); H04N 1/6086 (2013.01); H04N 9/735 (2013.01); *G06T 2207/10024* (2013.01); *G06T 2207/20081* (2013.01); *G06T 2207/20084* (2013.01)

(58) Field of Classification Search
CPC  G06T 2207/10024; G06T 2207/20072; H04N 1/6058; H04N 9/045; H04N 9/735
See application file for complete search history.

(56) References Cited

U.S. PATENT DOCUMENTS

| | | | |
|---|---|---|---|
| 6,075,905 | A | 6/2000 | Herman et al. |
| 6,411,953 | B1* | 6/2002 | Ganapathy .......... G06F 17/3025 |
| 7,113,649 | B2* | 9/2006 | Gindele ............... H04N 1/4074 |
| | | | 382/274 |
| 7,200,264 | B2* | 4/2007 | Hubel .................... H04N 9/735 |
| | | | 348/223.1 |
| 8,149,459 | B2* | 4/2012 | Mestha ................ H04N 1/6058 |
| | | | 358/1.9 |
| 8,155,454 | B2 | 4/2012 | Raveendrawn |
| 8,179,402 | B2* | 5/2012 | Ten .......................... H04N 9/67 |
| | | | 345/428 |
| 8,253,752 | B2 | 8/2012 | Raveendrawn |
| 8,988,536 | B2 | 3/2015 | Park et al. |
| 9,007,484 | B2* | 4/2015 | Zhang ..................... H04N 9/73 |
| | | | 348/223.1 |
| 9,336,582 | B1* | 5/2016 | Barron ...................... G06T 5/40 |
| 2003/0194125 | A1 | 10/2003 | Hubel et al. |
| 2010/0321539 | A1 | 12/2010 | Ito |

OTHER PUBLICATIONS

Alahi, Alexandre et al., "Freak: Fast Retina Keypoint," IEEE Conference on Computer Vision and Pattern Recognition (CVPR), 2012, pp. 510-517.
Barnard, Kobus, "Improvements to Gamut Mapping Colour Constancy Algorithms," In Computer Vision-ECCV 2000, pp. 390-403, Springer Berlin Heidelberg.
Barnard, Kobus et al., "A Comparison of Computational Color Constancy Algorithms—Part II: Experiments With Image Data," IEEE Transactions on Image Processing, 2002, pp. 985-996, vol. 11, No. 9.
Barron et al., "Fast Bilateral-Space Stereo for Synthetic Defocus," CVPR, 2015, 9 pages.
Barron, Jonathan T. et al., "Volumetric Semantic Segmentation using Pyramid Context Features," IEEE International Conference on Computer Vision (ICCV), 2013, pp. 3448-3455.
Barrow H. G. et al. "Recovering Intrinsic Scene Characteristics From Images," Computer Vision Systems, 1978, pp. 3-26, A. Hanson & E Riseman (eds.), New York: Academic Press.
Belongie, Serge et al., "Shape Context: A new descriptor for shape matching and object recognition," In NIPS, 2000, 7 pages, vol. 2.
Berens et al., "Log-opponent chromatically coding of colour space," IEEE, 2000, pp. 206-211.
Berg, Alexander C. et al., "Geometric Blur for Template Matching," Proceedings of the 2001 IEEE Computer Society Conference on Computer Vision and Pattern Recognition, (CVPR 2001), IEEE, 2001, 8 pages, vol. 1.
Berwick et al., "A Chromaticity Space for Specularity, Illumination Color- and Illumination Pose-Invariant 3-D Object Recognition," Sixth International Conference on Computer Vision, 1998, pp. 165-170.

Bianco, Simone et al., "Color Constancy Using Faces," IEEE Conference on Computer Vision and Pattern Recognition (CVPR), IEEE, 2012, pp. 65-72.
Brainard, David H. et al., "Analysis of the retinex theory of color vision," J. Opt. Soc. Am. A, Oct. 1986, pp. 1651-1661, vol. 3, No. 10.
Buchsbaum, G., "A spatial processor model for object colour perception," Journal of the Franklin Institute, 1980, pp. 1-26, vol. 310, No. 1.
Chakrabarti, Ayan, et aL, "Color constancy with spatio-spectral statistics," IEEE Transactions on Pattern Analysis and Machine Intelligence, 2012, pp. 1509-1519, vol. 34, No. 8.
Then, S. et al., "Real-time edge-aware image processing with the bilateral grid," ACM SIGGRAPH, 2007, pp. 1-9.
Cheng, Dongliang et al., "Illuminant Estimation for Color Constancy: Why spatial-domain methods work and the role of the color distribution," JOSA A, 2014, pp. 1049-1058, vol. 31, No. 5.
Esme, Biglin, "Kalman Filter for Dummies," Bilgin's Blog, Mar. 2009, 5 pages, http://bilgin.esme.org/BitsBytes/KalmanFilterforDummies.aspx.
Farbman, Zeev et al., "Convolution Pyramids," ACM Trans. Graph., 2011, pp. 1-9, vol. 30, No. 6.
Farnebäck, Gunnar, "Polynomial Expansion for Orientation and Motion Estimation," Linköping Studies in Science and Technology, Dissertations, Nov. 2002, pp. 1-182, http://lmi.bwh.harvard.edu/papers/pdfs/gunnar/farneback02.pdf.
Finlayson et al., "Shades of Gray and Colour Constancy," IS&T/SID Twelfth Color Imaging Conference, 2004, pp. 37-41.
Finlayson, Graham D., "Corrected-Moment Illuminant Estimation," IEEE International Conference on Computer Vision (ICCV), IEEE, 2013, pp. 1904-1911.
Gastal et al., Domain transform for edge-aware image and video processing. SIGGRAPH, 2011, 11 pages.
Gaussian, "The Exponential Family of Distributions," last accessed May 26, 2015, 13 pages, http://ww.cs.columbia.edu/~jebara/4771/tutorials/lecture12.pdf.
Gehler, Peter V., et al., "Bayesian Color Constancy Revisited," IEEE Conference on Computer Vision and Pattern Recognition, CVPR 2008, IEEE, 2008, pp. 1-8.
Gilchrist, Alan, Seeing Black and White, Oxford University Press, 2006, all pages.
Gijsenij, Arjan et al., "Color Constancy Using Natural Image Statistics and Scene Semantics," IEEE Transactions on Pattern Analysis and Machine Intelligence, 2011, pp. 687-698, vol. 33, No. 4.
Gijsenij, Arjan et al., "Computational Color Constancy: Survey and Experiments," IEEE Transactions on Image Processing, 2010, pp. 2475-2489, vol. 20, No. 9.
Joze, Hamid Reza Vaezi et al., "The Role of Bright Pixels in Illumination Estimation." In Color and Imaging conference, Society for Imaging Science and Technology, 2012, pp. 41-46, vol. 2012, No. 1.
Kalman filter, Wikipedia, http://en.wikipedia.org/wiki/Kalman_filter#Information_filter, last accessed May 26, 2015, 26 pages.
Lewis, J.P., "Fast Normalized Cross-Correlation," Expanded Version of paper from Vision Interface, 1995, 7 pages.
Rowse, Darren, "Introduction to White Balance," Digital Photography School, 2014, 5 pages.
Shi, Lilong et al., "Shi's Re-processed Version of the Gehler Color Constancy Dataset of 568 Images," Simon Fraser University (2010), http://www.cs.sfu.ca/~colour/data, 3 pages.
Taskar, Ben et al., "Learning Structured Prediction Models: A Large Margin Approach," In Proceedings of the 22nd International Conference on Machine Learning, ACM, 2005, 235 pages.
Tomasi et al., "Bilateral filtering for gray and color images," Proceedings of the 1998 IEEE International Conference on Computer Vision (ICCV) Bombay, India, 1998, 8 pages.
Van De Weijer, Joost et al., "Edge-Based Color Constancy," IEEE Transactions on Image Processing, 2007, pp. 2207-2214, vol. 16, No. 9.
Welch et al., "An Introduction to the Kalman Filter, Course 8," SIGGRAPH, 2001, pp. 1-81.

(56) References Cited

OTHER PUBLICATIONS

Notice of Allowance mailed on Feb. 8, 2016, issued in connection with U.S. Appl. No. 14/689,246, filed Apr. 17, 2015, 10 pages.
Notice of Allowance mailed on Feb. 24, 2016, issued in connection with U.S. Appl. No. 14/720,747, filed May 23, 2015, 7 pages.
Ex Parte Quayle Action mailed on Dec. 30, 2015, issued in connection with U.S. Appl. No. 14/720,747, filed May 23, 2015, 6 pages.
Barron, Jonathan T., "Convolutional Color Constancy," 2015 IEEE International Conference on Computer Vision, 2015, pp. 379-387.
Bianco et al., "Computational Color Constancy," 3rd European Workshop on Visual Information Processing, IEEE, 2011, pp. 1-7.
Finlayson et al., "Color constancy at a pixel," Journal of the Optical Society of America, 2001, pp. 253-264, vol. 18, No. 2.
International Searching Authority, International Search Report and Written Opinion mailed on Jul. 28, 2016, issued in connection with International Patent Application No. PCT/US2016/027031, filed on Apr. 12, 2016, 13 pages.

* cited by examiner

CONVOLUTIONAL COLOR CORRECTION

CROSS-REFERENCE TO RELATED APPLICATION

This application claims priority to U.S. patent application Ser. No. 14/689,246, filed Apr. 17, 2015, which is hereby incorporated by reference in its entirety.

BACKGROUND

Digital imaging may refer to capturing and representing the color and brightness characteristics of scenes in digital images (e.g., photographs or motion video). When a digital image of a particular scene is captured, the true colors of objects therein may be offset by the color of any lighting in the scene. Thus, the digital image may be further processed and/or enhanced to create a new digital image with colors that are closer to the true colors. However, it is challenging to carry out this color correction in a way that does not depend on the image sensor used to capture the digital image.

SUMMARY

The color of a pixel in a natural image can be represented as a product of two quantities, reflectance (e.g., the colors of the surfaces in the scene) and illumination (the color of the light striking the surfaces in the scene). Endowing a computer with the ability to discern reflectance from the illuminant is difficult, as this problem is under-constrained—given a yellow pixel, it is often unclear whether it represents a white object under a yellow illuminant, or a yellow object under a white illuminant. This challenge of inferring and correcting the color of the illumination of an image is commonly referred to as "color constancy" or "white-balance."

The embodiments herein disclose a color constancy technique based on an observation relating the scaling of the color channels of an image to the translation of a histogram of the log-chromaticity of that image. This observation allows the color constancy problem to be framed as a discriminative machine learning problem, using tools based on convolutional neural networks and structured prediction. By discriminatively training a color constancy technique in this way, the embodiments herein are able to reduce error rates on standard benchmarks by as much as 40%.

Accordingly, a first example embodiment may involve obtaining an input image. The input image may have a white point represented by chrominance values that define white color in the input image. The first example embodiment may also involve, based on colors of the input image, generating a two-dimensional chrominance histogram of the input image. The first example embodiment may further involve convolving the two-dimensional chrominance histogram with a filter to create a two-dimensional heat map. Entries in the two-dimensional heat map may represent respective estimates of how close respective tints corresponding to the respective entries are to the white point of the input image. The first example embodiment may additionally involve selecting an entry in the two-dimensional heat map that represents a particular value that is within a threshold of a maximum value in the heat map, and based on the selected entry, tinting the input image to form an output image.

In a second example embodiment, an article of manufacture may include a non-transitory computer-readable medium, having stored thereon program instructions that, upon execution by a computing device, cause the computing device to perform operations in accordance with the first example embodiment.

In a third example embodiment, a computing device may include at least one processor, as well as data storage and program instructions. The program instructions may be stored in the data storage, and upon execution by the at least one processor may cause the computing device to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
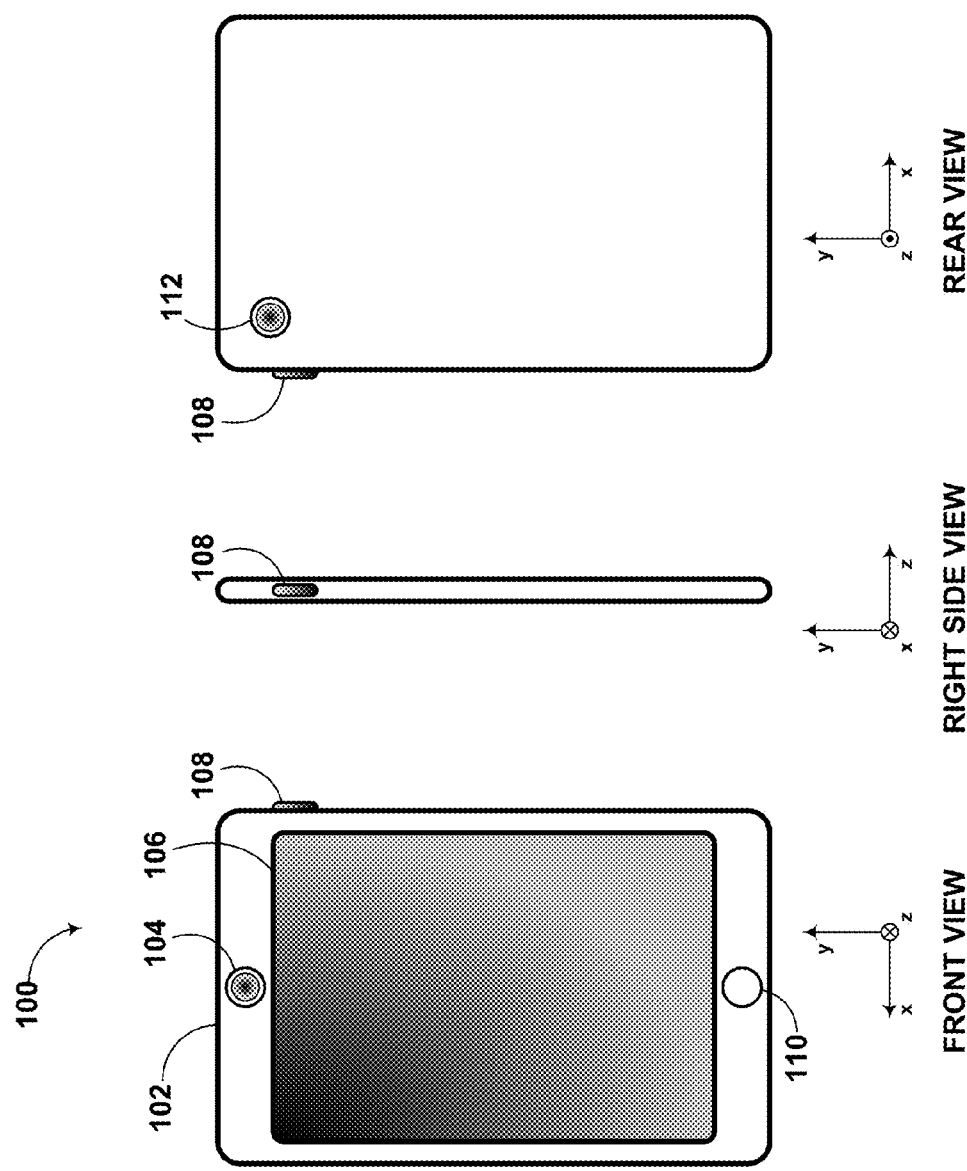
FIG. 1 depicts front, right side, and rear views of a digital camera device, according to example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

1. EXAMPLE IMAGE CAPTURE DEVICES

As image capture devices, such as cameras, become more popular, they may be employed as standalone hardware devices or integrated into various other types of devices. For instance, still and video cameras are now regularly included in wireless computing devices (e.g., mobile phones), tablet computers, laptop computers, video game interfaces, home automation devices, and even automobiles and other types of vehicles.

The physical components of a camera may include one or more apertures through which light enters, one or more recording surfaces for capturing the images represented by the light, and lenses positioned in front of each aperture to focus at least part of the image on the recording surface(s). The apertures may be fixed size or adjustable. In an analog camera, the recording surface may be photographic film. In a digital camera, the recording surface may include an electronic image sensor (e.g., a charge coupled device (CCD) or a complementary metal-oxide-semiconductor (CMOS) sensor) to transfer and/or store captured images in a data storage unit (e.g., memory).

One or more shutters may be coupled to or nearby the lenses or the recording surfaces. Each shutter may either be in a closed position, in which it blocks light from reaching the recording surface, or an open position, in which light is allowed to reach to recording surface. The position of each shutter may be controlled by a shutter button. For instance, a shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened," the sensor may be reset to remove any residual signal in its photodiodes. While the electronic shutter remains open, the photodiodes may accumulate charge. When or after the shutter closes, these charges may be transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that results in one or more images being recorded, regardless of how the shuttering process is triggered or controlled.

The exposure of a captured image may be determined by a combination of the size of the aperture, the brightness of the light entering the aperture, and the length of the shutter cycle (also referred to as the shutter length or the exposure length). Additionally, a digital and/or analog gain may be applied to the image, thereby influencing the exposure. In some embodiments, the term "total exposure length" or "total exposure time" may refer to the shutter length multiplied by the gain for a particular aperture size. Herein, the term "total exposure time," or "TET," should be interpreted as possibly being a shutter length, an exposure time, or any other metric that controls the amount of signal response that results from light reaching the recording surface.

A still camera may capture one or more images each time image capture is triggered. A video camera may continuously capture images at a particular rate (e.g., 24 images—or frames—per second) as long as image capture remains triggered (e.g., while the shutter button is held down). Some digital still cameras may open the shutter when the camera device or application is activated, and the shutter may remain in this position until the camera device or application is deactivated. While the shutter is open, the camera device or application may capture and display a representation of a scene on a viewfinder. When image capture is triggered, one or more distinct digital images of the current scene may be captured.

Cameras—even analog cameras—may include software to control one or more camera functions and/or settings, such as aperture size, TET, gain, and so on. Additionally, some cameras may include software that digitally processes images during or after these images are captured. While the description above refers to cameras in general, it may be particularly relevant to digital cameras.

As noted previously, digital cameras may be standalone devices or integrated with other devices. As an example, FIG. 1 illustrates the form factor of a digital camera device 100. Digital camera device 100 may be, for example, a mobile phone, a tablet computer, or a wearable computing device. However, other embodiments are possible. Digital camera device 100 may include various elements, such as a body 102, a front-facing camera 104, a multi-element display 106, a shutter button 108, and other buttons 110. Digital camera device 100 could further include a rear-facing camera 112. Front-facing camera 104 may be positioned on a side of body 102 typically facing a user while in operation, or on the same side as multi-element display 106. Rear-facing camera 112 may be positioned on a side of body 102 opposite front-facing camera 104. Referring to the cameras as front and rear facing is arbitrary, and digital camera device 100 may include multiple cameras positioned on various sides of body 102.

Multi-element display 106 could represent a cathode ray tube (CRT) display, a light emitting diode (LED) display, a liquid crystal (LCD) display, a plasma display, or any other type of display known in the art. In some embodiments, multi-element display 106 may display a digital representation of the current image being captured by front-facing camera 104 and/or rear-facing camera 112, or an image that could be captured or was recently captured by either or both of these cameras. Thus, multi-element display 106 may serve as a viewfinder for either camera. Multi-element display 106 may also support touchscreen and/or presence-sensitive functions that may be able to adjust the settings and/or configuration of any aspect of digital camera device 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing camera 112 may be similarly or differently arranged. Additionally, front-facing camera 104, rear-facing camera 112, or both, may be an array of one or more cameras.

Either or both of front facing camera 104 and rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Either or both of front facing camera 104 and rear-facing camera 112 may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine a TET of an associated camera, or to help in this determination.

Digital camera device 100 could be configured to use multi-element display 106 and either front-facing camera 104 or rear-facing camera 112 to capture images of a target object. The captured images could be a plurality of still images or a video stream. The image capture could be triggered by activating shutter button 108, pressing a softkey on multi-element display 106, or by some other mechanism. Depending upon the implementation, the images could be captured automatically at a specific time interval, for example, upon pressing shutter button 108, upon appropriate lighting conditions of the target object, upon moving digital camera device 100 a predetermined distance, or according to a predetermined capture schedule.

As noted above, the functions of digital camera device 100—or another type of digital camera—may be integrated into a computing device, such as a wireless computing device, cell phone, tablet computer, laptop computer and so on. For purposes of example, FIG. 2 is a simplified block diagram showing some of the components of an example computing device 200 that may include camera components 224.

By way of example and without limitation, computing device 200 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, or some other type of device equipped with at least some image capture and/or image processing capabilities. It should be understood that computing device 200 may represent a physical camera device such as a digital camera, a particular physical hardware platform on which a camera application operates in software, or other combinations of hardware and software that are configured to carry out camera functions.

Figure 2:
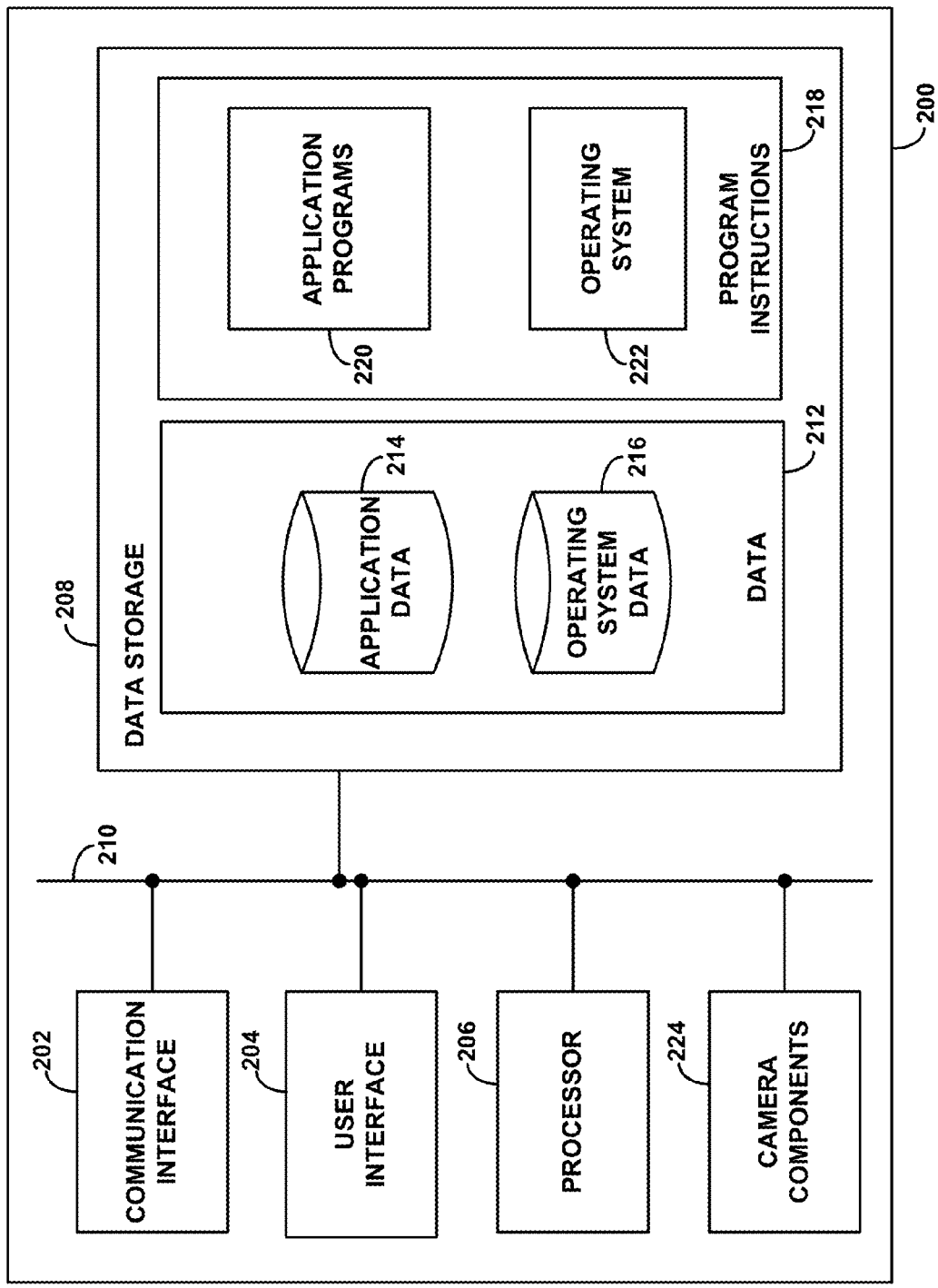
FIG. 2 depicts a block diagram of a computing device with image capture capability, according to example embodiments.

As shown in FIG. 2, computing device 200 may include a communication interface 202, a user interface 204, a processor 206, data storage 208, and camera components 224, all of which may be communicatively linked together by a system bus, network, or other connection mechanism 210.

Communication interface 202 may allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

In some embodiments, user interface 204 may include a display that serves as a viewfinder for still camera and/or video camera functions supported by computing device 200. Additionally, user interface 204 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented by way of a presence-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, and/or shutter button. Camera components 224 may be controlled at least in part by software executed by processor 206.

2. EXAMPLE COLOR MODELS

This section describes, in a general sense, ways in which color may be represented on a computer screen or in an image file. This information may be useful in the context of the image processing techniques described in the following sections.

Captured images can be digitally represented using a number of color models. For example, the red-green-blue (RGB) color model may be used for display of images on electronic output devices, such as computer screens. RGB is an additive color model in which red, green, and blue light are added together in various ways to produce a spectrum of colors. For instance, cyan may be formed by combining green and blue, yellow may be formed by combining red and green, magenta may be formed by combining red and blue, and white may be formed by combining red, green, and blue.

A particular pixel of an RGB image may be expressed as a three-plane tuple (R,G,B), each plane of which can vary from 0 to a pre-defined maximum value (e.g., 255). If all of the planes are 0, the result may be black. If all of the planes are at the maximum value, the result may be the brightest representable white. (The color planes described herein may also be referred to as color channels.)

Another color model is YCbCr. In some implementations, this color model may be used as an alternative representation of an image. Particularly, the Y plane may represent the brightness of a pixel, and the Cb and Cr planes may represent the blue-yellow chrominance and red-green chrominance, respectively. For instance, the blue-yellow chrominance may be represented by the blue pixel value in an RGB image divided by the green pixel value in the RGB image, and the red-green chrominance may be represented by the red pixel value in the RGB image divided by the green pixel value in the RGB image. Thus, the YCbCr color model has a well-defined relationship with the RGB color model and can be converted to and from this RGB with relative ease.

3. EXAMPLE WHITE-BALANCING

White-balancing is an adjustment that a digital camera device, or associated software, can make to a captured image in an attempt to ensure that the white color in the image properly reflects the actual white colors in the real-world scene from which the image was captured. To understand white-balance, it is helpful to first understand the concept of the concept of color temperature.

Color temperature measures the quality of a light based on the ratio of the amount of blue light to the amount of red light in an image or scene. Color temperature is expressed in units of Kelvin (K) degrees. An image or scene with higher color temperature (i.e., a larger Kelvin value) has more blue than an image or scene with lower color temperature (i.e., smaller Kelvin value). Thus, a "cooler" light has a higher color temperature, while a warmer light has a lower color temperature.

The human eyes and brain can adjust to different color temperatures. For instance, humans see a white object as white regardless of whether it is viewed under strong sunlight or in a room illuminated with incandescent lights. Digital camera devices usually have built-in sensors to measure the color temperature of a scene, and may use an algorithm to process captured images of the scene so that the final result is close to how a human would perceive the scene. This adjustment to make the white colors in the image resemble the white colors in the scene is referred to as white-balancing. Current white-balance algorithms may not be accurate enough so that the white point of every image resembles that of the scene it represents. (The white point of an image represents the chrominance values that define "white" in the image.)

The embodiments herein provide high-quality white-balance techniques that can operate with a wide range of image sensor hardware. These techniques operate in real-time, or near-real-time, in software. This may obviate the need for hardware-specific white-balance algorithms to be provided with various image sensors.

To achieve this goal, the embodiments herein consider the appearance of the "output" white-balanced image, and are not dependent on the appearance of the "input" image (here, the "input" image is an image captured by an image sensor prior to application of a white-balance algorithm). This means that if one camera produces images that are consistently tinted cyan, and another camera produces images that are consistently tinted purple, for example, the white-balance algorithm herein may produce the same white-balanced output image (assuming both images have similar radiometric properties—that the black level has been corrected, that the images are linear, etc.). This means that if the white-balance algorithm herein is trained (e.g., by way of one or more machine learning techniques) on images captured by one manufacturer's hardware, it should still work well on images captured by another manufacturer's hardware.

The property of considering "output" white-balanced images also simplifies training. Typically, implementing a white-balance algorithm for a new camera sensor involves collecting a large dataset of images with that sensor, and manually annotating the illuminant color for each of those images, which is a slow and expensive proposition. But with the approach described herein, a white-balance algorithm can be trained based on publicly-available images, so that the white-balance algorithm reproduces the white-balance of those images.

The white-balance algorithm herein not only produces high quality results, but it currently outperforms the state-of-the-art in the academic literature by a 20%-40% reduction in error. However, the current state-of-the-art techniques are not designed to generalize across different image sensors.

Additionally, the white-balance algorithm herein is designed to be idempotent, meaning that if it is applied once to an image, it white-balances the image, and if it is applied again to the white-balanced image, it makes no further appreciable changes to the image. This property also means that the algorithm will not fail if the tint of the input image is altered by some other white-balance algorithm in the photographic pipeline.

In order to frame the problem formally, consider a perfectly photometric linear image, in which black-level correction has already occurred and in which no pixel values are saturated (e.g., the intensities of the colors in each color channel of the pixel are below some threshold value, such as 255). Log-space representations may be used below for convenience.

As noted above, an RGB pixel $[I_r, I_g, I_b]$ may be a product of a "true" or white-balanced color $[W_r, W_g, W_b]$ and an illuminant of the scene $[L_r, L_g, L_b]$. Accordingly:

$$I_r = W_r L_r \tag{1}$$

$$I_g = W_g L_g \tag{2}$$

$$I_b = W_b L_b \tag{3}$$

Nonetheless, Equations (1), (2), and (3) are an oversimplification of the problem, as they ignore shading, reflectance properties, spatially-varying illumination, etc. Regardless, given I, a goal is to estimate L and with that, produce W=I/L. To that end, chrominance representations for I and W can be defined:

$$I_u = \log(I_g/I_r) \tag{4}$$

$$I_v = \log(I_g/I_b) \tag{5}$$

$$W_u = \log(W_g/W_r) \tag{6}$$

$$W_v = \log(W_g/W_b) \tag{7}$$

Additionally, it is convenient to define a representation of luminance for I and W:

$$I_y = \min(I_r, I_g, I_b) \tag{8}$$

$$W_y = \min(W_r, W_g, W_b) \tag{9}$$

This representation of luminance indicates confidence in the estimation of u and v—if any of a pixel's r, g, or b values are near zero, then at least one chrominance estimate is likely to be noisy or wrong. Since the absolute scaling of W need not be explicitly considered in the embodiments herein, the problem of estimating the illuminant L simplifies further to estimating the chrominance of L, which can just be represented as two numbers:

$$L_u = \log(L_g/L_r) \tag{10}$$

$$L_v = \log(L_g/L_b) \tag{11}$$

By the properties of logarithms, the formulation of Equations (1), (2), and (3) can be rewritten in log-chrominance space as:

$$W_u = I_u - L_u \tag{12}$$

$$W_v = I_v - L_v \tag{13}$$

As a consequence, correcting the white-balance of an image reduces to determining two quantities: $L_u$ and $L_v$. Because of the absolute scale ambiguity, the inverse mapping from RGB space to the UV space of $(L_u, L_v)$ is undefined. Therefore, determining $L_u$ and $L_v$, it can be assumed that L is unit-norm which allows recovery of $(L_r, L_g, L_b)$:

$$L_r = \frac{\exp(-L_u)}{z} \tag{14}$$

$$L_g = \frac{1}{z} \tag{15}$$

$$L_b = \frac{\exp(-L_v)}{z} \tag{16}$$

$$z = \sqrt{\exp(-L_u)^2 + \exp(-L_v)^2 + 1} \tag{17}$$

This log-chrominance formulation is simpler to work with than the RGB formulation. There are 2 unknowns instead of 3, and there is a linear constraint relating W and I instead of a multiplicative constraint.

In order to determine these values $(L_u, L_v)$ and ultimately $(L_r, L_g, L_b)$ for an input image I with ground truth illumination L, a two-dimensional chrominance histogram N may be constructed. In this histogram, N(u, v) indicates the number of pixels in I whose chrominance is near (u, v), where histogram counts are weighted by the luminance of respective pixels therein. This weighting reflects confidences in the respective chrominance values. Formally:

$$N(u,v) = \Sigma_i I_y^{(i)} [(|I_u^{(i)} - u| \le \epsilon/2)^\wedge (|I_v^{(i)} - v| \le \epsilon/2)] \tag{18}$$

Where the square brackets represent an indicator function, and $\epsilon$ is the bin-width of the histogram. (In practice, $\epsilon = 0.025$ and 256-bin histograms may be used; however, other values of $\epsilon$ and other numbers of histogram bins may be used instead.)

After constructing the histogram N, it may be normalized to have a constant mass. Further, the square root of the count in each bin may be taken, which may improve the effectiveness of the histogram's features. Nonetheless, any ad-hoc normalization is possible as long as the same transformation is applied to the entire histogram.

Figure 3:
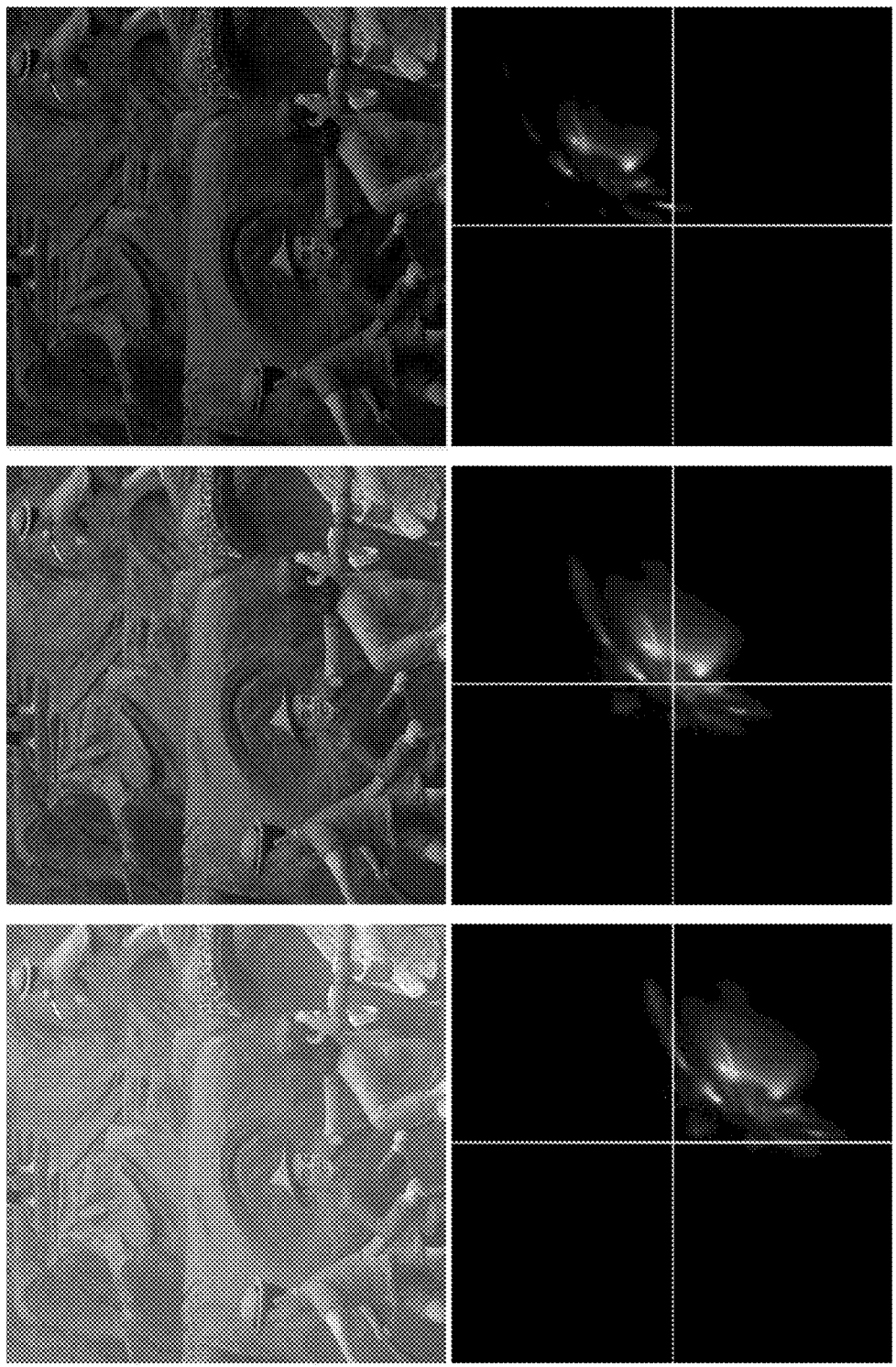
FIG. 3 depicts three tints of an image and associated chrominance histograms for each, according to example embodiments.

FIG. 3 contains three tinted versions of the same image in the top row, and each image's corresponding chrominance histogram in the bottom row. FIG. 3 depicts these images in black and white using different levels of brightness to present different tints. In color versions of the images in FIG. 3, the image in the left column is tinted greenish yellow, the image in the middle column is white-balanced, and the image in the right column is tinted reddish yellow.

Moving from the left end to the right end of the x-axis of each chrominance histogram represents changing the blue-yellow tint of the associated image from a dominant blue to a dominant yellow. Likewise, moving from the top end to the bottom end of the y-axis of each chrominance histogram represents changing the red-green tint of the associated image from a dominant red to a dominant green. Overall, each chrominance histogram represents the relative number of pixels with a chrominance falling in each position on this x-y plot. Thus, the cluster of points in the left-column chrominance histogram indicates a green and yellow tint, the cluster of points in the middle-column chrominance histogram indicates a neutral (white-balanced) tint, and the cluster of points in the right-column chrominance histogram indicates a red and yellow tint.

The center of each cluster of points represents the white point of the associated image, and the origin of the chrominance histogram is what looks white to a human. By centering the cluster of points around the origin of the chrominance histogram, a neutral tint may be achieved.

The chrominance histogram of each image is a translated version of the other chrominance histograms (ignoring the sampling introduced by the histogram operation), and the shape of the histogram does not change. Thus, tinting an image affects the image's chrominance histogram only by a translation in histogram-space. This is a consequence of u and v being defined as they are herein—scaling an RGB channel is equivalent to shifting a log-chrominance channel. Luminance has no impact on this translation.

The equivalence between image-tinting and histogram-shifting facilitates white-balancing. Particularly, a white-balancing algorithm may operate by considering some or all possible tints of an image, scoring each tinted image, and then providing the highest-scoring tint (or rather, its inverse) as the estimated illumination of the input image. For instance, it would be desirable for the tint associated with the middle column chrominance histogram to have the highest score so that the white-balance algorithm tints the input image to be neutral.

Naively, doing this scoring may seem like an expensive proposition, as it requires a brute-force search over all possible tints, where some scoring function is applied at each tint. However, provided that the scoring function is a linear combination of histogram bins, this brute-force search is actually just the convolution of N with some filter F, and there are many ways that convolution operations can be made efficient.

Thus, at a high level, a white-balance algorithm can perform the following steps: (i) construct a chrominance histogram N from the input image I, (ii) convolve that histogram with some filter F, and (iii) use a high-scoring (e.g., the highest-scoring) illumination $\hat{L}$ to produce W=I/$\hat{L}$. More formally:

$$(\hat{L}_u, \hat{L}_v) = \operatorname{argmax}_{u,v} (N * F) \qquad (19)$$

Where * is the convolution operator.

This procedure involves learning some filter F from training data such that this convolution produces accurate output. To train the filter, a model similar to multinomial logistic regression or structured prediction may be applied to a convolutional framework. Formally, this can be expressed as an optimization problem:

$$\min_F \lambda \sum_{u,v} F(u, v)^2 + \sum_i \sum_{u,v} P(u, v) C(u, v, L_u^{(i)}, L_v^{(i)}) \qquad (20)$$

Where:

$$P(u, v) = \frac{\exp((N^{(i)} * F)(u, v))}{\sum_{u',v'} \exp((N^{(i)} * F)(u', v'))} \qquad (21)$$

In Equation (21), F is the filter of which weights are learned, $\{N^{(i)}\}$ and $\{L^{(i)}\}$ are training-set chrominance histograms and ground truth illuminations respectively, and $(N^{(i)} * F)(u, v)$ is the convolution of $N^{(i)}$ and F indexed at location (u, v). For convenience, P(u, v) is a softmax probability for each bin (u, v) in the histogram, as a function of $N^{(i)} * F$. Thus, P(u, v) represents a normalized exponential function of a convolution of each training histogram with the filter.

The filter weights are regularized by minimizing the sum of squares of the elements of F, moderated by some hyper-parameter λ. At a high level, minimizing loss results in an F such that $N^{(i)} * F$ is larger at $(L_u^{(i)}, L_v^{(i)})$ than it is elsewhere, where C(u, v, u*, v*) defines the loss incurred at mis-estimated illuminants as follows:

$$C(u, v, u^*, v^*) = \arccos\left(\frac{\langle l, l^* \rangle}{\|l\| \|l^*\|}\right) \qquad (22)$$

And:

$$l = [\exp(-u), 1, \exp(-v)]^T \qquad (23)$$

$$l^* = [\exp(-u^*), 1, \exp(-v^*)]^T \qquad (24)$$

Figure 4:
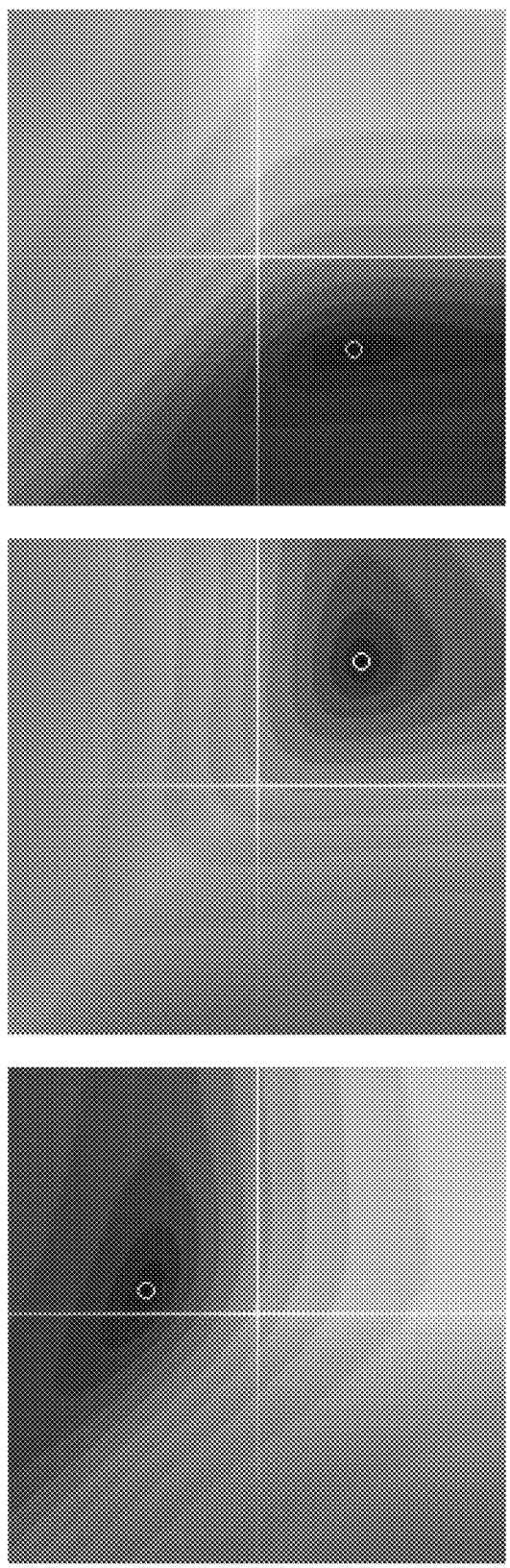
FIG. 4 depicts visualizations of a cost function, used during training, as a function of proposed illumination color, according to example embodiments.

C measures the angle between the illuminations defined by (u, v) and (u*, v*), the loss measure by which color-constancy algorithms can be evaluated. Visualizations of C can be seen in FIG. 4. Particularly, FIG. 4 depicts visualizations of C(u, v, u*, v*) as a function of the proposed illumination color (u, v), with each plot showing a difference choice of the ground-truth illumination color (u*, v*) (circled). Because error is measured in terms of the angle between RGB illumination vectors, the shape of this error function can look different depending on the ground-truth illumination.

During training, Equation (21) can be solved to convergence with Broyden-Fletcher-Goldfarb-Shanno (BFGS) techniques, such as limited-memory BFGS (L-BFGS). Particularly, F may be initialized to all zeros (which works despite the non-convexity of the loss function). This problem resembles logistic regression but where every (u, v) has variable loss defined by C associated with it, measuring the cost of each possible (u, v) chrominance with respect to some ground-truth chrominance (u*, v*). The variable cost makes the model resemble a structured prediction-like process.

Regardless, the learned F reflects the distribution of colors in white-balanced scenes, and F is independent of the tints of the training images as a result of the aforementioned shift-invariance of the chrominance histograms, combined with F being evaluated as a convolution. During inference, F may be used to find the most likely illumination according to the model, but the model does not actually consider the likelihood of that illumination. This is similar to learning a generative model of the distribution of natural colors, with an exception being that the model of natural colors used herein is learned by discriminative training.

A discriminative model generally models the dependence of an unobserved variable on an observed variable. In contrast, a generative model is a full probabilistic model of all variables. Thus a generative model can be used, for example, to generate values of any variable in the model, whereas a discriminative model allows sampling of the unobserved variables conditional on the observed variables.

Advantageously, the model herein uses the power of discriminative training while still only learning a model of natural images, rather than learning a model that is specialized to a specific camera or image sensor.

A. Example Filtering Efficiency Improvements

The previously-described algorithm convolves chrominance histograms with a filter, but did not specify exactly what kind of filter should be used. A reasonable choice is to use a "full" filter—a filter the same size as the histogram being filtered. But such a full filter is somewhat expensive to evaluate (even when using fast Fourier transforms (FFTs) to optimize the convolution), and has a very large number of free parameters which can make regularization and training difficult.

Filters that perform well in the embodiments described above tend to have a log-polar or "retinotopic" structure, in which the filter contains a large amount of high-frequency variation near the center of the filter, and contains low-frequency variation far from the center. Intuitively, this makes sense—when localizing the illumination color of an image, the model should pay close attention to chrominance variation near the white point, while only broadly considering chrominance variation far from the white point.

With this observation, pyramid-based filtering can be used. Pyramid filtering works by constructing a Gaussian pyramid of the input signal (e.g., a 3-level, 5-level, or 7-level from $N(u, v)$ using bi-linear downsampling), then filtering each scale with a small filter (e.g., a 3×3, 5×5, or 7×7 filter), and then collapsing the filtered pyramid down into an image (e.g., using bilinear upsampling). This process produces identical or near-identical output (ignoring the necessary approximations incurred by downsampling and upsampling) as convolving $N(u, v)$ with a retinotopic-like filter, but is more efficient. In addition to being efficient, this filter has few free parameters, so optimization and regularization are easy, and it can describe fine detail in the center while being smooth and coarse in shape far from the center. Regularization may occur by minimizing the squared 2-norm of the filter coefficients at each scale, all modulated by a single hyper-parameter $\lambda$, as in Equation (20). A visualization of pyramid filtering can be seen in FIG. 5.

Figure 5:
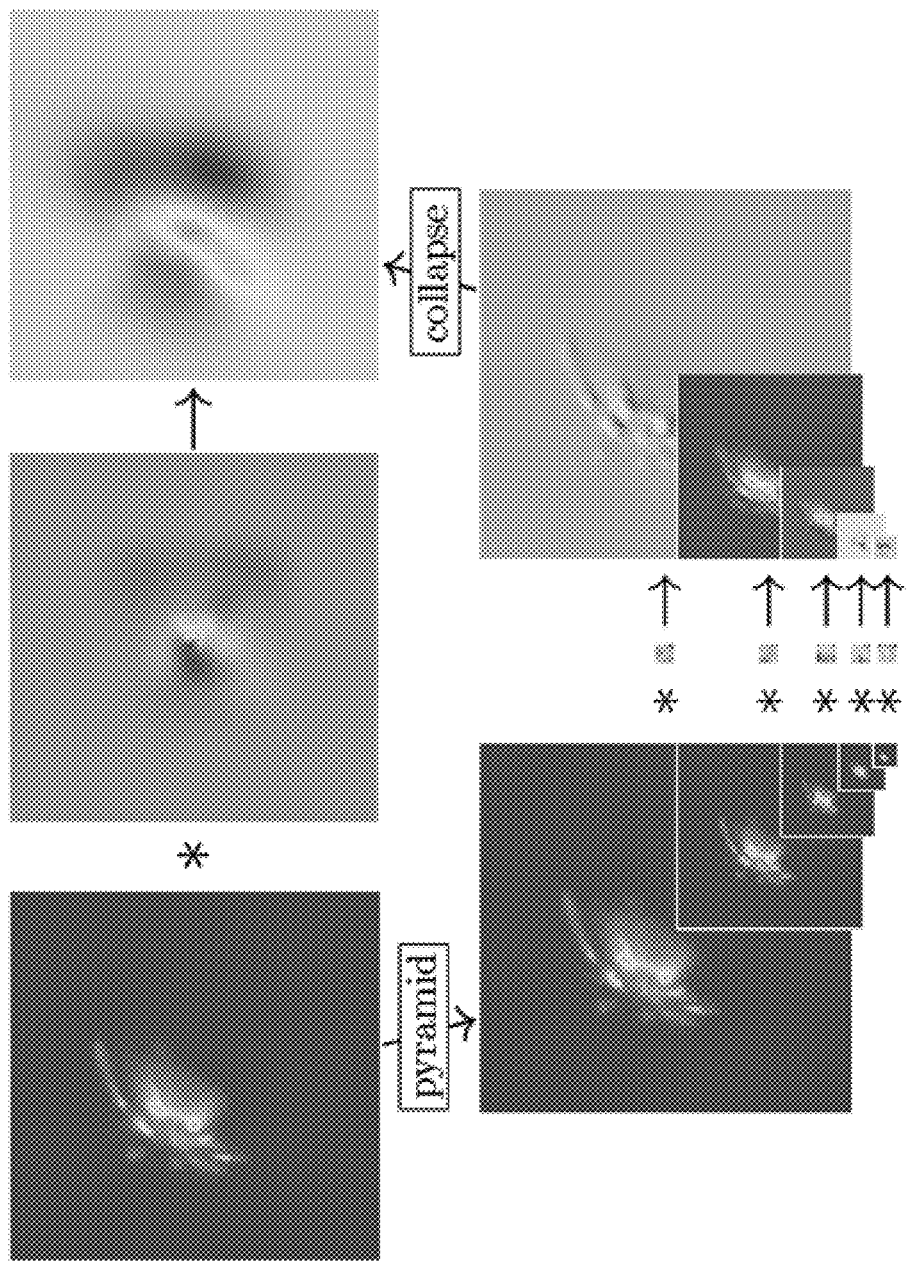
FIG. 5 depicts a visualization of pyramid filtering, according to example embodiments.

In particular, the top row of FIG. 5 depicts convolving a histogram with a filter that has strong detail in the center and coarse detail elsewhere. The bottom row depicts evaluating that same filter more efficiently by instead constructing a pyramid from the histogram, filtering each scale of the pyramid with a small filter, and then collapsing the filtered histogram. By using the latter approach, filtering speed is decreased.

Pyramid filtering can be thought of computing computer vision features like shape context or geometric blur density at every position in the image, and then classifying each feature with a linear classifier. However, the pyramid approximation herein assumes that the sampling pattern of the feature be rectangular instead of polar, that the scales of the feature be discretized to powers of 2, and that the sampling patterns of the feature at each scale overlap. This technique of also applying a filter to each scale of a pyramid to approximate an image-space function also resembles convolution pyramids.

B. Example Generalization

The previously described algorithm can estimate the illumination L from an image I by filtering a histogram N constructed from the chrominance values of the pixels in I. Effectively, this model is a sophisticated kind of "gray world" algorithm, in that it tries to normalize the color of each pixel, but ignores spatial information. However, to obtain better performance, the color constancy algorithm may use additional sources of information, such as the color of edges or spatial neighborhoods.

To that end, the algorithms disclosed herein may be extended. Instead of constructing and classifying a single histogram N from a single image I, a set of histograms $\{N_j\}$ from a set of "augmented" images $\{I'_j\}$ may be filtered. The filtered responses may be summed before computing softmax probabilities. These augmented images reflect edge and spatial statistics of the image I, thereby enabling the model to combine multiple sources of chrominance information besides individual pixel chrominance.

One might construct these augmented images $\{I'_j\}$ by simply applying common image processing operations to I, such as applying a filter bank, median filters, morphological operations, etc. But, the image from which chrominance histograms are constructed should map color-scaling to the channels of the input image to shifts in chrominance histogram space. This means that the augmented images should preserve this property, and map a per-channel scaling to the same shift in histogram space. Thus, there may be a limited set of possible augmented images that for use.

It can be shown that, for the color-scaling/histogram-shifting property to be met, the mapping should preserve scalar multiplication—a scaled-then-filtered version of a channel in the input image I should be equal to a filtered-then-scaled version of that channel. Additionally, the output of the mapping should be non-negative as the logarithm of these values may be taken. Three such mappings are the following:

$$f(I, \text{filt}) = \max(0, I * \text{filt}) \quad (25)$$

$$g(I, \rho, w) = \text{blur}(I^\rho, w)^{1/\rho} \quad (26)$$

$$h(I, \rho, w) = (\text{blur}(I^\rho, w) - \text{blur}(I, w)^\rho)^{1/\rho} \quad (27)$$

Where $\text{blur}(\cdot, w)$ is a boxfilter of width w. In general, box filtering of an image applies a linear filter to an input image such that each pixel in the filtered image has a value equal to the average value of its neighboring pixels in the input image. For instance, a 3×3 box filter can be applied to each pixel of the input image to blur, sharpen, detect edges, and perform other effects to the input image.

The function $f(\cdot, \text{filt})$ convolves each channel of the image with some filter filt and then clamps the filtered value to be at least 0. The function $g(\cdot)$ computes a local norm of pixel values in I such that $g(\cdot, 1, w)$ is a blur. The function $f(\cdot, \infty, w)$ is a "max" filter, and $f(\cdot, \infty, w)$ is a "min" filter. The function $h(\cdot)$ computes a normalized moment of pixel values, where $g(\cdot, 2, w)$ computes the local standard deviation of pixel values—a kind of non-oriented edge/texture detector.

It can be demonstrated that all three of these operations preserve scalar multiplication:

$$f(\alpha I, \text{filt}) = \alpha f(I, \text{filt}) \quad (28)$$

$$g(\alpha I,\rho,w)=\alpha g(I,\rho,w) \quad (29)$$

$$h(\alpha I,\rho,w)=\alpha h(I,\rho,w) \quad (30)$$

In the extended model, four channels are used: the input image I itself, the image filtered with a "sharpening" filter and rectified, a large-support "max-filter"-like matrix, and a small-support local standard deviation matrix:

$$I'_1 = I \quad (31)$$

$$I'_2 = \max\left(0, I * \begin{bmatrix} 0 & -1 & 0 \\ -1 & 5 & -1 \\ 0 & -1 & 0 \end{bmatrix}\right) \quad (32)$$

$$I'_3 = \text{blur}(I^4, 11)^{1/4} \quad (33)$$

$$I'_4 = \sqrt{\text{blur}(I^2, 3) - \text{blur}(I, 3)^2} \quad (34)$$

Figure 6:
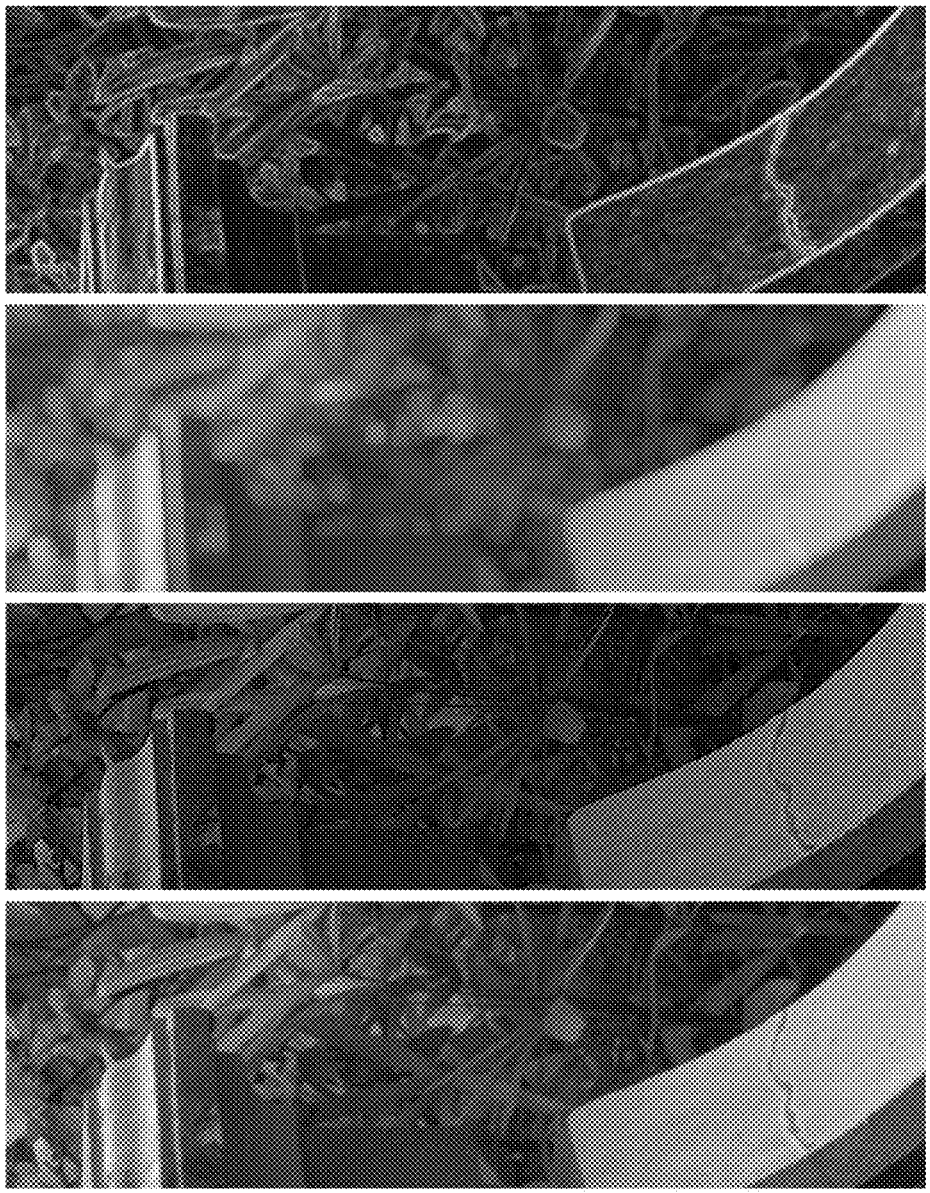
FIG. 6 depicts visualizations of the information captured by four channels associated with enhanced images, according to example embodiments.

FIG. 6 depicts visualizations of the information captured by each of these channels. During training these four pyramid filters are learned, one for each channel. The individual filter responses are summed before computing softmax probabilities. Therefore, though the algorithm disclosed herein can use the pixel values of just input image I as its input, performance can be improved by using the set of "augmented" images as input. The extended model uses four augmented images which capture local edge and neighborhood statistics, in addition to the input image.

4. EXAMPLE OPERATIONS

Figure 7:
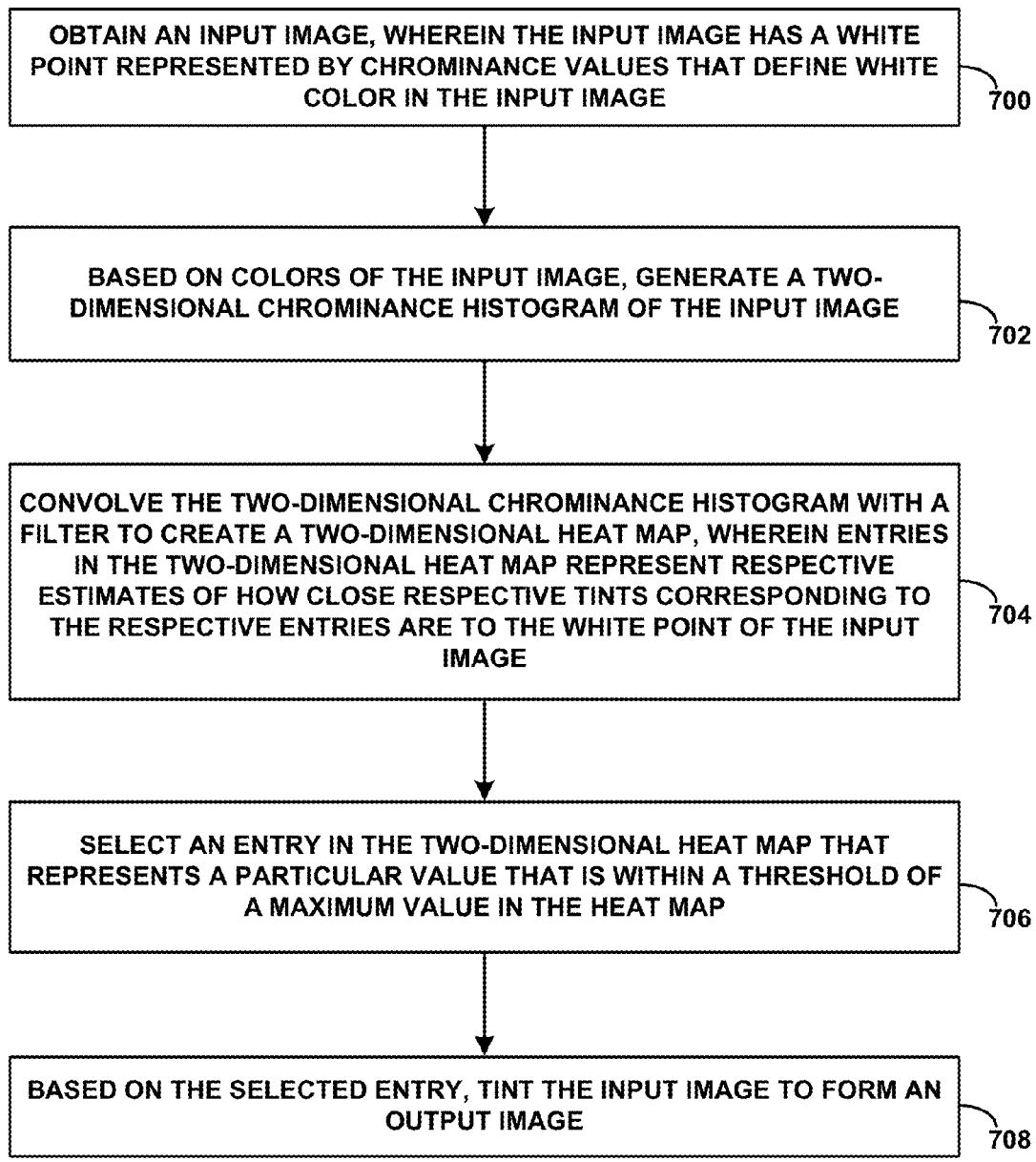
FIG. 7 is a flow chart, according to example embodiments.

FIG. 7 is a flow chart illustrating an example embodiment. The embodiment illustrated by FIG. 7 may be carried out by a computing device, such as digital camera device 100. However, the embodiment can be carried out by other types of devices or device subsystems. Further, the embodiment may be combined with any aspect or feature disclosed in this specification or the accompanying drawings.

Block 700 of FIG. 7 may involve obtaining an input image. The input image may have a white point represented by chrominance values that define white color in the input image. Obtaining the input image may involve a computing device capturing the input image.

Block 702 may involve, possibly based on colors of the input image, generating a two-dimensional chrominance histogram of the input image. In some embodiments, generating the two-dimensional chrominance histogram may involve using a logarithm of a ratio of pixel values for each dimension of the histogram, normalizing the two-dimensional chrominance histogram to have a constant mass, and taking the square root of each bin of the two-dimensional chrominance histogram.

Block 704 may involve convolving the two-dimensional chrominance histogram with a filter to create a two-dimensional heat map. Entries in the two-dimensional heat map may represent respective estimates of how close respective tints corresponding to the respective entries are to the white point of the input image.

Block 706 may involve selecting an entry in the two-dimensional heat map that represents a particular value that is within a threshold of a maximum value in the heat map. The threshold may be within a certain percentage of the maximum value (e.g., 5%, 10%, 20%, etc.), or may be within a fixed offset of the maximum value. Thus, the particular value may be the maximum value or a value that is close to the maximum value.

Block 708 may involve, possibly based on the selected entry, tinting the input image to form an output image. This tinting may involve applying the filter to the image, wherein the filter is parameterized by the selected entry. As a possible result, the output image may be more white-balanced than the input image.

In some embodiments, bin (u, v) in the two-dimensional chrominance histogram represents a number of pixels in the input image with chrominance values within a chrominance threshold of (u, v). In these embodiments, u may represent a logarithm of a first quotient, and v may represent a logarithm of a second quotient. The first quotient may be of red pixel value in the input image divided by green pixel value in the input image. The second quotient may be of blue pixel value in the input image divided by green pixel value in the input image. Further, the bins of the two-dimensional chrominance histogram may be weighted by luminances of the pixels therein.

In some embodiments, the filter may be trained based on a set of training chrominance histograms of respective training images, each associated with respective known illuminations of the respective training images. As such, the filter may be trained using a normalized exponential function of a convolution of each training histogram with the filter. Alternatively or additionally, after training, the filter may represent a distribution of colors in white-balanced scenes, and may be independent of tints of the training images.

Possibly based on colors of the input image, a plurality of augmented two-dimensional chrominance histograms may be generated from augmented versions of the input image. Each of the augmented versions of the input image may preserve scalar multiplication properties when filtered. Convolving the two-dimensional chrominance histogram with the filter may involve summing filtered responses of the plurality of augmented two-dimensional chrominance histograms before applying the normalized exponential function.

5. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    based on colors of an input image, generating, by a processor, a two-dimensional chrominance histogram of the input image;
    convolving, by the processor, the two-dimensional chrominance histogram with a filter to create a two-dimensional heat map, wherein entries in the two-dimensional heat map represent respective estimates of how close respective tints corresponding to the respective entries are to a white point of the input image;
    selecting, by the processor, an entry in the two-dimensional heat map that represents a particular value that is within a threshold of a value in the heat map that represents a tint that is closest to the white point; and
    applying, by the processor, the filter to the input image to form an output image, wherein the filter is parameterized by the selected entry.

2. The method of claim 1, wherein the white point is represented by chrominance values that define white color in the input image.

3. The method of claim 1, further comprising:
    based on the selected entry, tinting the input image to form an output image.

4. The method of claim 3, wherein the output image is more white-balanced than the input image.

5. The method of claim 1, wherein generating the two-dimensional chrominance histogram comprises:
    using a logarithm of a ratio of pixel values for each dimension of the histogram;
    normalizing the two-dimensional chrominance histogram to have a constant mass; and
    taking the square root of each bin of the two-dimensional chrominance histogram.

6. The method of claim 1, wherein bin (u, v) in the two-dimensional chrominance histogram represents a number of pixels in the input image with chrominance values within a chrominance threshold of (u, v), wherein u represents a logarithm of a first quotient, and wherein v represents a logarithm of a second quotient, wherein the first quotient is of red pixel value in the input image divided by green pixel value in the input image, and wherein the second quotient is of blue pixel value in the input image divided by green pixel value in the input image.

7. The method of claim 1, wherein bins of the two-dimensional chrominance histogram are weighted by luminances of the pixels therein.

8. The method of claim 1, further comprising:
    before generating the two-dimensional histogram, capturing the input image.

9. The method of claim 1, wherein the filter is trained based on a set of training chrominance histograms of respective training images, each associated with respective known illuminations of the respective training images.

10. The method of claim 9, wherein the filter is trained using a normalized exponential function of a convolution of each training histogram with the filter.

11. The method of claim 10, the further comprising:
    based on colors of the input image, generating a plurality of augmented two-dimensional chrominance histograms from augmented versions of the input image, wherein each of the augmented versions of the input image preserve scalar multiplication properties when filtered,
    wherein convolving the two-dimensional chrominance histogram with the filter comprises summing filtered responses of the plurality of augmented two-dimensional chrominance histograms before applying the normalized exponential function.

12. The method of claim 9, wherein, after training, the filter represents a distribution of colors in white-balanced scenes, and is independent of tints of the training images.

13. An article of manufacture including a non-transitory computer-readable medium, having stored thereon program instructions that, upon execution by a processor of computing device, cause the computing device to perform operations comprising:
    based on colors of an input image, generating a two-dimensional chrominance histogram of the input image;
    convolving the two-dimensional chrominance histogram with a filter to create a two-dimensional heat map, wherein entries in the two-dimensional heat map represent respective estimates of how close respective tints corresponding to the respective entries are to a white point of the input image;
    selecting an entry in the two-dimensional heat map that represents a particular value that is within a threshold of a value in the heat map that represents a tint that is closest to the white point; and
    applying the filter to the input image to form an output image, wherein the filter is parameterized by the selected entry.

14. The article of manufacture of claim 13, wherein generating the two-dimensional chrominance histogram comprises:
    using a logarithm of a ratio of pixel values for each dimension of the histogram;
    normalizing the two-dimensional chrominance histogram to have a constant mass; and
    taking the square root of each bin of the two-dimensional chrominance histogram.

15. The article of manufacture of claim 13, wherein bin (u, v) in the two-dimensional chrominance histogram represents a number of pixels in the input image with chrominance values within a chrominance threshold of (u, v), wherein u represents a logarithm of a first quotient, and wherein v represents a logarithm of a second quotient, wherein the first quotient is of red pixel value in the input image divided by green pixel value in the input image, and wherein the second quotient is of blue pixel value in the input image divided by green pixel value in the input image.

16. The article of manufacture of claim 13, wherein bins of the two-dimensional chrominance histogram are weighted by luminances of the pixels therein.

17. The article of manufacture of claim 13, wherein the filter is trained based on a set of training chrominance histograms of respective training images, each associated with respective known illuminations of the respective training images.

18. The article of manufacture of claim 17, wherein the filter is trained using a normalized exponential function of a convolution of each training histogram with the filter.

19. The article of manufacture of claim 18, the operations further comprising:
    based on colors of the input image, generating a plurality of augmented two-dimensional chrominance histograms from augmented versions of the input image, wherein each of the augmented versions of the input image preserve scalar multiplication properties when filtered,
    wherein convolving the two-dimensional chrominance histogram with the filter comprises summing filtered responses of the plurality of augmented two-dimensional chrominance histograms before applying the normalized exponential function.

20. A method comprising:
    based on a set of training chrominance histograms of respective training images, training, by a processor, a filter, wherein the chrominance histograms are associated with respective known illuminations in which the respective training images were captured, and wherein, after training, the filter represents a distribution of colors in white-balanced scenes, and is independent of tints of the training images; and
    applying, by the processor, the filter to an input image to form an output image, wherein the output image is a white-balanced version of the input image.

* * * * *